（12）United States Patent
Kaupert et al.

(10) Patent No.: US 7,677,884 B2
(45) Date of Patent: Mar. 16, 2010

(54) BURNER

(75) Inventors: Andreas Kaupert, Ulm (DE); Gunter Eberspach, Wolfschlugen (DE); Andreas Collmer, Aichwald (DE)

(73) Assignee: J. Eberspacher GmbH & Co. KG, Esslingen (DE)

( * ) Notice: Subject to any disclaimer, the term of this patent is extended or adjusted under 35 U.S.C. 154(b) by 1274 days.

(21) Appl. No.: 11/178,221

(22) Filed: Jul. 8, 2005

(65) Prior Publication Data
US 2006/0008756 A1    Jan. 12, 2006

(30) Foreign Application Priority Data
Jul. 9, 2004   (DE) ................ 10 2004 033 545

(51) Int. Cl.
F23D 14/62   (2006.01)
F23D 14/12   (2006.01)
(52) U.S. Cl. ................ 431/354; 431/328; 431/160
(58) Field of Classification Search ........... 431/354, 431/328, 326, 160
See application file for complete search history.

(56) References Cited
U.S. PATENT DOCUMENTS
4,933,242 A * 6/1990 Koga et al. ............ 429/19

| 5,803,725 A | 9/1998 | Horn et al. |
| 6,296,814 B1 | 10/2001 | Bonk et al. |
| 6,596,424 B2 * | 7/2003 | Goebel ............ 429/17 |
| 2002/0064487 A1 | 5/2002 | Sederquist et al. |
| 2004/0115490 A1 | 6/2004 | Kaupert et al. |

FOREIGN PATENT DOCUMENTS

| DE | 3726875 A1 | 5/1988 |
| DE | 10244883 B4 | 4/2004 |
| GB | 2197714 A | 5/1988 |

OTHER PUBLICATIONS
German Search Report dated Jul. 27, 2004.
* cited by examiner Primary Examiner—Alfred Basichas
(74) Attorney, Agent, or Firm—Howard IP Law Group, PC

(57) ABSTRACT

A burner for burning a gaseous fuel containing hydrogen with a gaseous oxidizer containing oxygen, having a combustion chamber in which the combustion reaction takes place during operation of the burner and having a wall structure which seals off the combustion chamber on the input end and which has multiple fuel openings through which the fuel is introduced into the combustion chamber during operation of the burner and has multiple oxidizer openings through which the oxidizer is introduced into the combustion chamber during operation of the burner.

11 Claims, 4 Drawing Sheets

BURNER

This application claims foreign priority of German Patent Application No. DE 10 2004 033 545.1, filed Jul. 9, 2004 in Germany, which application is incorporated herein by reference in its entirety.

FIELD OF THE INVENTION

The present invention relates to a burner for burning a gaseous fuel containing hydrogen using a gaseous oxidizer containing oxygen.

BACKGROUND OF THE INVENTION

Modern motor vehicles may be equipped with an electric power-generating device that operates with a fuel cell independently of the engine to supply the electric power needed by the vehicle. To do so, a hydrogen-containing fuel gas is produced as a reformate with the help of a reformer from the particular fuel supplied to it, such as gasoline or diesel. This reformate or fuel gas may then be utilized to generate electric current in a fuel cell together with a gaseous oxidizer containing oxygen, usually air. The fuel cell therefore contains at least one electrolyte plate, with the fuel gas flowing past the anode side and the oxidizer gas flowing past the cathode side. Chemical reactions occur in both the fuel gas and the oxidizer gas, forming the respective reaction products. Usually not all the hydrogen in the fuel gas is reacted, so a hydrogen-product gas mixture comes out of the fuel cell on the anode side. The situation is similar with the oxidizer mixture because, as a rule, not all of the oxygen can be reacted there either. Consequently, an oxygen-product gas mixture comes out of the fuel cell on the cathode side. From the standpoint of strict limits on pollutant emissions, it is not desirable to discharge hydrogen into the environment.

The present invention addresses the problem of providing a method of reducing pollution for a fuel cell.

This problem is solved according to this invention through the objects of the independent claims. Advantageous embodiments are the object of the dependent claims.

SUMMARY OF THE INVENTION

This invention is based on the general idea of supplying the oxidizer and the fuel to a combustion chamber of the burner through separate fuel openings and/or oxidizer openings designed in a wall structure bordering the combustion chamber. Due to the separate supply of oxidizer and fuel, thorough mixing of the oxidizer and fuel occurs only in the combustion chamber and/or at the entrance to the combustion chamber. As a result, the highly reactive fuel-oxidizer mixture is formed only in the combustion chamber and/or at the entrance thereto. In this way, the combustion reaction can take place reliably in the combustion chamber.

From the standpoint of pollutant emissions of a fuel cell, the inventive burner can be used in an especially simple manner to supply the hydrogen-product gas mixture on the anode side as a fuel and the oxygen-product gas mixture on the cathode side as an oxidizer to the combustion chamber to burn the remaining hydrogen therein. This effectively prevents emission of hydrogen into the environment.

According to an especially advantageous embodiment, at least one heat exchanger or heat transfer medium is provided, said medium being heated by the heat of combustion during operation of the burner and being tied into a heating circuit which serves to heat an internal combustion engine and/or a passenger compartment of a motor vehicle and/or a cargo area of a vehicle and/or at least one educt of a reformer and fuel cell process. This makes it possible to implement an additional heating independently of the engine in a clever manner while at the same time reducing pollutant emissions by the fuel cell.

An especially compact design for such a fuel cell-burner combination and/or for such a fuel cell-heater combination can be achieved by the fact that the wall structure of the burner forms one of two end plates of a fuel cell having multiple electrolyte plates between their end plates, with a fuel path and an oxidizer path being formed in or between them. The wall structure thus forms a shared component of the fuel cell and the burner, which presents a compact space-saving design.

Other important features and advantages of this invention are derived from the subclaims, the drawings and the respective description of the figures with reference to the drawings.

It is self-evident that the features mentioned above and those yet to be explained below can be used not only in the particular combination given but also in any other combinations or alone without going beyond the scope of the present invention.

Preferred exemplary embodiments of this invention are depicted in the drawings and explained in greater detail in the following description, where the same reference notation is used to refer to the same or functionally same or similar components.

DETAILED DESCRIPTION OF THE PREFERRED EMBODIMENTS

Figure 1:
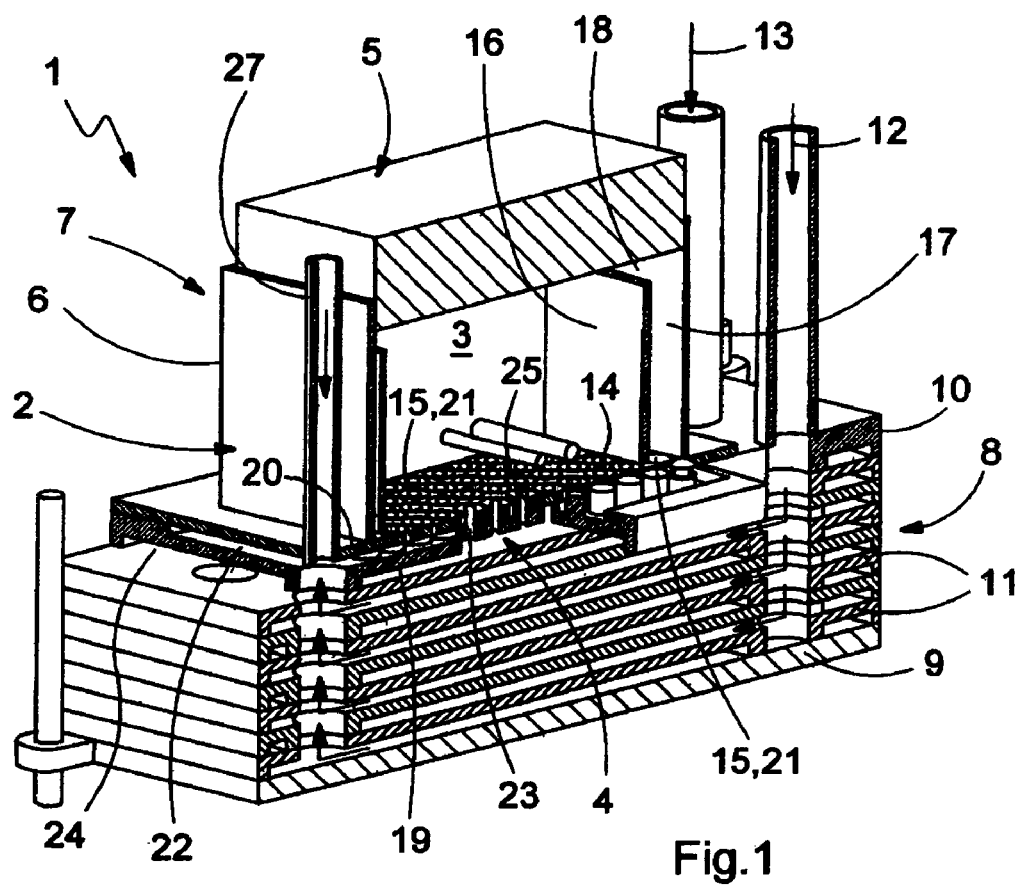
FIG. 1 a partially cutaway perspective view of a fuel cell-heater combination according to this invention, FIG. 2 a longitudinal section through the fuel cell-heater combination according to FIG. 1, FIG. 3 a cross section through the fuel cell-heater combination according to FIG. 1, FIG. 4 an enlarged view of a detail IV in FIG. 2, FIG. 5 an enlarged perspective view of a wall structure of a burner according to this invention as seen from above, FIG. 6 a view like that in FIG. 5 but of another embodiment, FIG. 7 a partially cutaway perspective view of the wall structure, but in another embodiment.
Figure 4:
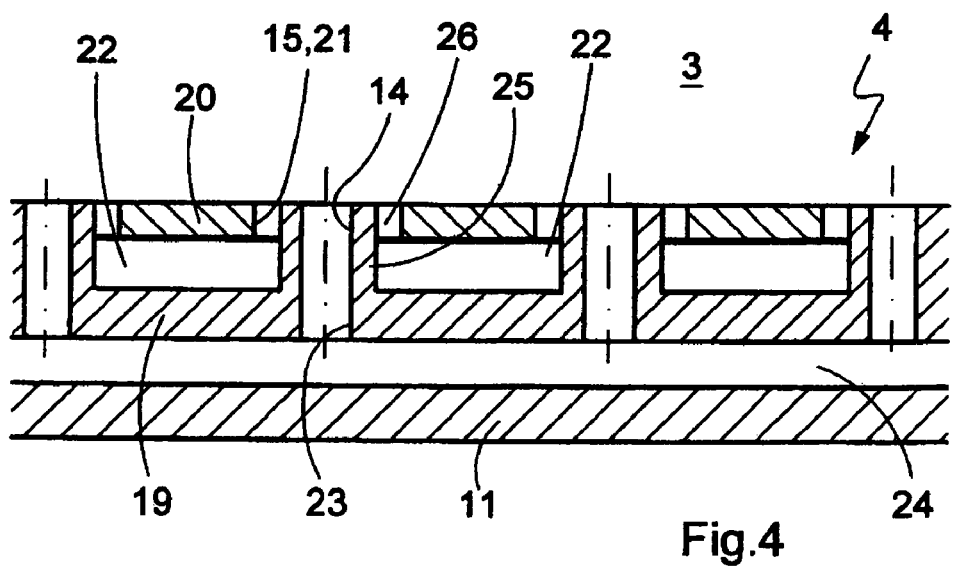

FIG. 1 through FIG. 5 illustrate one possible embodiment of an inventive fuel cell-heater combination 1 which is equipped with a burner 2 according to this invention. This burner 2 contains a combustion chamber 3 in which a combustion reaction can take place during operation of the burner 2. The burner 2 here is bordered at the input end by a wall structure 4 and at the output end by the heat exchanger 5 and at the sides by an outside wall 6. The combustion chamber 3 is supplied with a gaseous fuel containing hydrogen and with a gaseous oxidizer containing oxygen through the wall structure 4. The hot combustion exhaust gases can leave the combustion chamber 3 through the heat exchanger 5 arranged at the output end. The heat exchanger 5 is heated in this process.

The combination of the burner 2 with the heat exchanger 5 forms a heater 7 which may be used, for example, for preheating the internal combustion engine, in particular in a motor vehicle, and/or for heating the passenger compartment of a motor vehicle and/or for heating a useful space of a motor vehicle. Use of the heater 7 for preheating educts of a reformer and fuel cell process is especially advantageous. Such educts usually include air and fuel, e.g., diesel, gasoline, SynFuel, SunFuel, hydrogen, natural gas. Then the heat exchanger 5 is integrated in a suitable manner into a corresponding heating circuit (or cooling circuit) of the internal combustion engine and/or a passenger compartment and/or useful space heating. To preheat the educts, they may also be tied into the heat exchanger 5 through an appropriate heating circuit or connected in a manner suitable for heat transfer or passed through the heat exchanger 5.

The combination 1 also includes a fuel cell 8 which may be designed as a high-temperature fuel cell (SOFC=solid-oxide fuel cell), for example. The fuel cell includes two end plates 9 and 10 as well as several electrolyte plates 11 that are stacked one above the other and arranged between the end plates 9 and 10. The electrolyte plates 11 are designed and stacked in such a way that they form a fuel path 12 on the anode side and an oxidizer path 13 on the cathode side in the interior of the fuel cell 8. The fuel path 12 and the oxidizer path 13 are indicated here by arrows oriented in the respective direction of flow. The fuel in the fuel cell 8 is a reformate produced by a reformer (not shown here). In an application of the combination 1 in a motor vehicle, the reformer operates with the fuel available there, i.e., with diesel or gasoline. Accordingly, the reformate consists at least mostly of hydrogen. The oxidizer of the fuel cell 8 is usually ambient air and thus contains mostly oxygen. In flowing through the fuel path 12 and the oxidizer path 13, a large portion of the hydrogen and oxygen are converted into electricity, i.e., chemical reactions take place in which reaction products are produced and electric current is generated. The electric current thus generated can be tapped, so the fuel cell 8 can be utilized as an electric power-generating system.

A hydrogen-product gas mixture containing unburned hydrogen is generated by the fuel cell process in the fuel path 12 and sent to the burner 2 as fuel. Similarly, an oxidizer-product mixture gas containing unburned oxygen which is sent to burner 2 as the oxidizer is formed in the oxidizer path 13 during the fuel cell process. This fuel may be burned with the oxidizer in the burner 2. Therefore, emission of hydrogen to the environment can be prevented. At the same time, the resulting waste heat is utilized for heating various items of equipment and in particular the educts of the reformer and fuel cell process with the help of the heat exchanger 5.

The embodiment shown here in which the end plate 10 of the fuel cell 8 facing the burner 2 is formed by the wall structure 4 of the burner 2 is especially advantageous. This means that the functionally of this end plate 10 is integrated into the wall structure 4. In this way the inventive fuel cell-heater combination 1 can be designed to be especially compact.

If the burner 2 is not part of a heater 7, then the combination 1 involves accordingly only a fuel cell-burner combination.

In an alternative design, the burner 2 may also be implemented without a fuel cell 8, e.g., in a heating system independent of the engine in a vehicle operated with hydrogen. The wall structure 4 may be provided with a suitable sealing plate (not shown here) on a side facing away from the combustion chamber 3 while otherwise being unchanged. In particular, the burner 2 may be designed so that it may optionally be used as a separate burner 2 or in combination with the fuel cell 8.

Since a hydrogen-oxidizer mixture is highly reactive, there is the risk of spontaneous combustion, especially in combination with high temperatures. To reduce this risk, with the inventive burner 2, the fuel mixture is formed only in the combustion chamber 3 and/or at the inlet of fuel and oxidizer into the combustion chamber 3. To this end, the wall structure 4 has multiple fuel openings 14 through which fuel can be introduced into the combustion chamber 3 during operation of the burner 2. In addition, the wall structure 4 has multiple oxidizer openings 15 which are separate from the fuel openings 14 and through which the oxidizer can be introduced into the combustion chamber 3 during operation of the burner 2. In the preferred embodiment illustrated here, the fuel openings 14 and the oxidizer openings 15 are in one plane. This plane expediently extends perpendicular to the direction of entrance of fuel and oxidizer into the combustion chamber 3. On the whole this yields a homogeneous distribution of the inflowing gases in combination with a corresponding uniform and especially symmetrical arrangement of the oxidizer openings 15 and the fuel openings 14. In this way, an especially large flame front, which also burns with a comparatively high stability, can be implemented within the combustion chamber 3.

Figure 2:
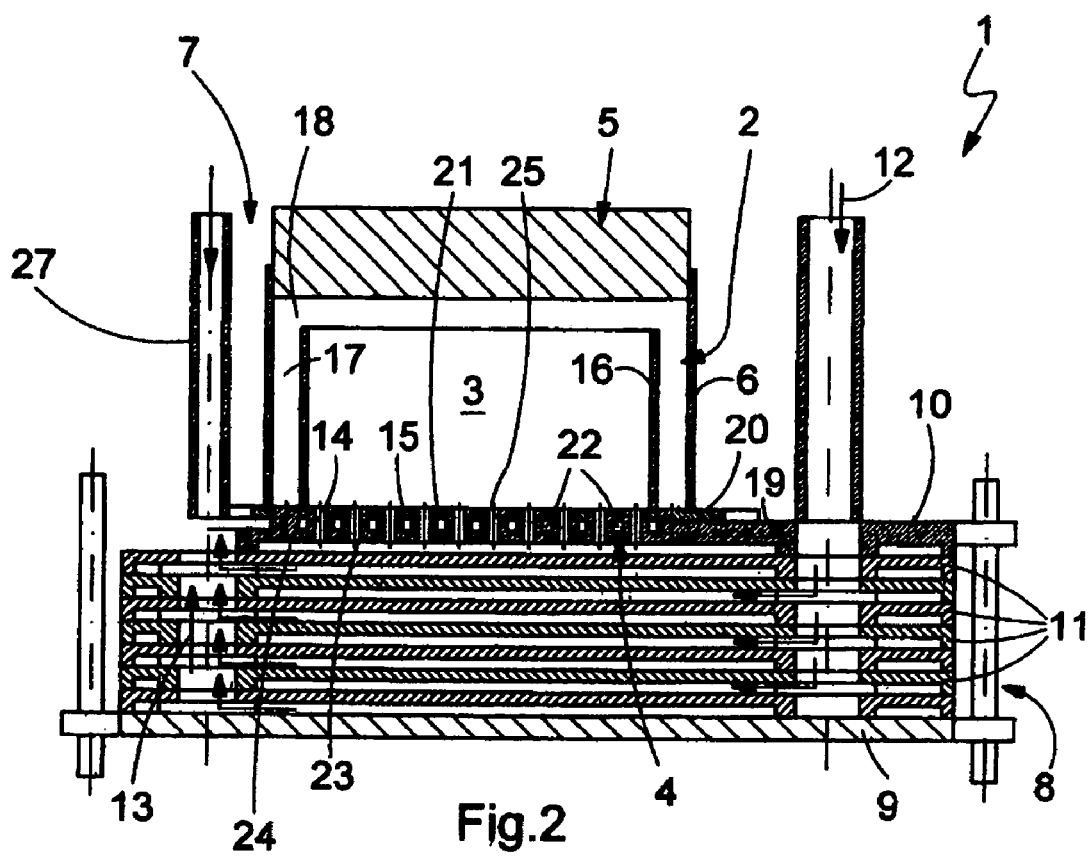
Figure 3:
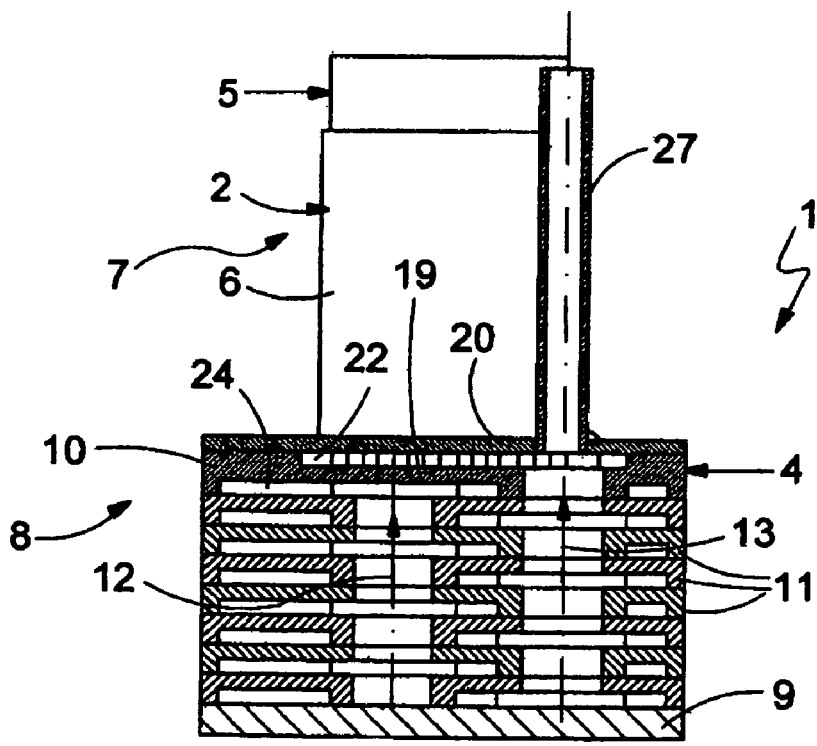

FIG. 1 through FIG. 3 also show an especially advantageous variant of the burner 2, because the combustion chamber 3 here is additionally encompassed at the side by an inside wall 16, which is provided on the inside, in addition to the outside wall 6, which is provided on the outside. The inside wall 16 extends essentially parallel to the outside wall 6 and at a distance from the outside wall 6 so that a cooling space 17 is formed between the inside wall 16 and the outside wall 6. This cooling space 17 surrounds the combustion chamber 3 completely in the circumferential direction in particular. This cooling space 17 is charged with a cooling gas during operation of the burner 2 so that the inside wall 16 and in particular the outside wall 6 can be cooled effectively. The cooling gas used here is preferably the oxidizer, which is introduced into the cooling space 17 at the inlet end through multiple oxidizer openings 15. Accordingly, the cooling space 17 is connected at the inlet end to multiple oxidizer openings 15. At the outlet end, the cooling space 17 communicates with the interior of the combustion chamber 3 at 18. To do so, the inside wall 16 does not lead entirely up to the heat exchanger 5 so that the oxidizer used for cooling can flow from the cooling space 17 into the combustion chamber 3 at the free end of the inside wall 16. For example, this cooling gas may be used for secondary combustion.

With the embodiment of FIG. 1 through FIG. 3 illustrated here, an additional line 27 is also connected to the hollow space 22 through which in case of need additional oxidizer, e.g., cold air can be supplied to the hollow space 22 and thus to the combustion chamber 3.

To be able to introduce the oxidizer and the fuel separately from one another into the combustion chamber 3 through the fuel openings 14 and the oxidizer openings 15, the wall structure 4 is preferably equipped with a base plate 19 and a cover plate 20. The cover plate 20 is arranged on a side of the base plate 19 facing the combustion chamber 3. The cover plate 20 has at least a plurality of first through-openings 21 which coincide with or form the oxidizer openings 15 in the embodiments according to FIG. 1 through FIG. 5.

In the embodiments according to FIG. 1 through FIG. 6, a hollow space 22 is formed between the cover plate 20 and the base plate 19. The first through-openings 21 in the cover plate 20 communicate with this hollow space 22. In the embodiments according to FIG. 1 through FIG. 4, this hollow space 22 is connected to the oxidizer path 13 so that the oxidizer-product gas mixture leaving the fuel cell 8 on the cathode side enters the hollow space 22 and goes from there into the combustion chamber 3 through the first through-openings 21, in other words, through the oxidizer openings 15.

In the embodiments according to FIG. 1 through FIG. 6, the base plate 19 is also equipped with several through-openings 23. The base plate 19 separates the hollow space 22 from a feed chamber 24 with which the through-openings 23 in the base plate 19 communicate. These through-openings 23 are also connected to the fuel openings 14, but this will be explained in greater detail below. In the embodiments of FIG. 1 through FIG. 4 shown here, the feed chamber 24 is connected to the fuel path 12 of the fuel cell 8. Accordingly, the hydrogen-product gas mixture emerging from the fuel cell 8 on the anode side enters the feed chamber 24 and out of the through-openings 23 in the base plate 19 and into the combustion chamber 3 through the fuel openings 14. Thus, with the help of the base plate 19, the oxidizer supplied through the hollow space 22 can be reliably separated from the fuel supplied through the feed chamber 24 up to the entrance into the combustion chamber 3.

The embodiments according to FIG. 1 through FIG. 5 are a special embodiment in which the through-openings 23 in the base plate 19 are arranged coaxially with the first through-openings 21 in the cover plate 20. This is shown clearly in FIG. 2 and FIG. 4 in particular. During operation of the burner 2, the coaxial alignment results in the fuel gas, which is supplied through the feed chamber 24, as well as the oxidizer gas, which is supplied through the hollow space 22, entering into the combustion chamber 3 either directly or indirectly through the first through-openings 21 in the cover plate 20 in such a way that the fuel gas is surrounded by the oxidizer gas which is supplied through the hollow space 22. Thus, with each first through-opening 21 in the cover plate 20, the gases are thus introduced coaxially one into the other. This makes it possible to achieve an especially intense and thorough mixing of the oxidizer and fuel.

To be able to achieve the desired enveloping of the fuel stream by the oxidizer stream at the respective first through-opening 21 in the cover plate 20 in an especially simple manner, the first through-openings 21 in the cover plate 20 are expediently furnished with larger cross section than the respective through-openings 23 in the base plate 19.

Essentially, the enveloping of the fuel gas with the oxidizer gas can already take place in the hollow space 22 when the fuel gas must first flow through the hollow space 22 and through the through-openings in the base plate 19 to arrive at the respective first through-opening 21 in the cover plate 20. However, the embodiment shown here in which some or all of the through-openings 23 in the base plate 19 are surrounded by a sleeve 25 is preferred. These sleeves 25 are enclosed by the base plate 19 and protrude into the hollow space 22. In addition, the sleeves 25 which are provided to guide the fuel are open on their end, which is at a distance from the base plate 19, this open end forming the respective fuel opening 14. In the embodiments shown here, the sleeves 25 are also of such dimensions that they extend into and through the respective first through-opening 21 in the cover plate 20 until they are flush with the cover plate 20. Essentially, however, longer sleeves 25 or shorter sleeves 25 are also conceivable. This design achieves the result that an annular gap 26 is formed radially between the sleeve 25 and an opening edge of the respective first nozzle opening 21 in the cover plate 20 in the case of the respective sleeves 25. During operation of the burner 2, the gas supplied through the hollow space 22 via the burner 2 can enter the combustion chamber 3 through this annular gap 26, i.e., the oxidizer here can enter the combustion chamber 3. Essentially the annular gaps 26 thus define the oxidizer openings 15. Expediently, the sleeves 25 are designed in one piece on the base plate 19, e.g., by deep-drawing the base plate 19, whereby the openings 23 and 14 may also be formed at the same time. Essentially however separate sleeves are also conceivable and are then connected to the base plate 19 in a suitable manner.

With the embodiments described above and below, the oxidizer is supplied to the hollow space 22 and the fuel is supplied to the feed chamber 24, but essentially a reversal of the flow guidance is also possible, so that then the oxidizer is supplied to the feed chamber 24 while the fuel is supplied to the hollow space 22.

Figure 5:
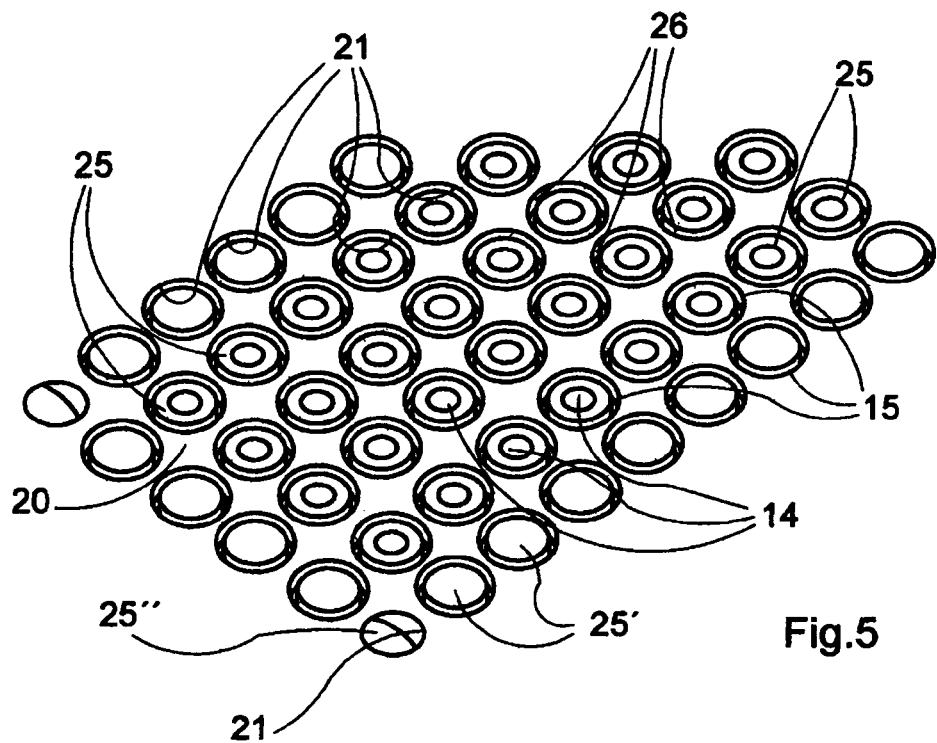

FIG. 5 shows again a perspective view of a detail of the wall structure on the side facing the combustion chamber 3. The ring channels 26 which define the oxidizer openings 15 are clearly discernible as are the fuel openings 14 arranged coaxially thereto. The sleeves 25 which protrude into the first through-openings 21 in the cover plate 20 and thereby form the annular gaps 26 are also discernible. Closed sleeves 25' are arranged around the open sleeves 25 which contain the fuel openings 14. In this way the annular gaps 26 and thus the ring-shaped oxidizer openings 15 can be defined without fuel openings 14 being provided coaxially thereto. The closed sleeves 25' arranged on the outside are provided for positioning in the cooling chamber 17, for example. Essentially, however, it is also possible to omit such closed sleeves 25' in this area and instead to provide the first through-openings 21 in this area with smaller cross sections. In addition, another sleeve 25" shown as an example in FIG. 5 is fitted into the respective first through-opening 21. In particular this sleeve 25" may be pressed to the cover plate 20. In this way, the cover plate 20 can be joined to the base plate 19 in an especially intense and simple manner.

Figure 6:
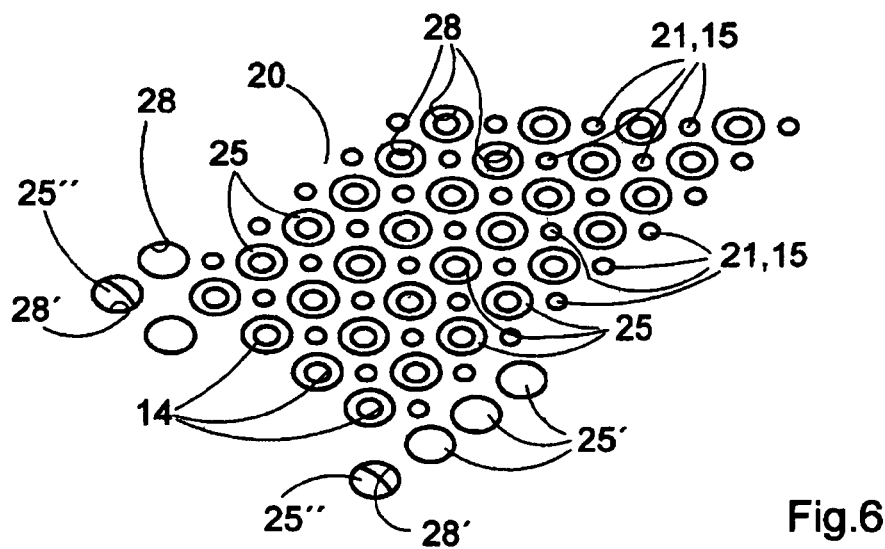

FIG. 6 shows another embodiment in which the over plate 20 additionally has multiple second through-openings 28. These second through-openings 28 in the cover plate 20 are aligned coaxially with the through-openings 23 in the base plate 19. As a result, during operation of the burner 2, the fuel first passes through the through-openings 23 in the base plate 19 and then through the second through-openings 28 in the cover plate 20 to enter the combustion chamber 3. In contrast with that, the oxidizer passes through the first through-openings 21 in the cover plate 20, entering the combustion chamber 3 directly. In order for the fuel from the through-openings 23 in the base plate 19 not to become mixed with the oxidizer on its path to the second through-openings 28 in the cover plate 20, it may also be expedient here to again provide a sleeve 25 for connecting the through-openings 23 in the base plate 19 to the respective second through-openings 28 in the cover plate 20. These sleeves 25 are then arranged and mounted in such a way that they seal the respective connection between the respective through-opening 23 and the respective second through-opening 28 with respect to the hollow space 22. This can be achieved as depicted in FIG. 6 by having the sleeves 25 protrude into the second through-openings 28 in such a way that they fit tightly. It is likewise fundamentally possible to kinematically reverse the construction so that the sleeves 25 protrude from the cover plate 20 and extend tightly into suitably dimensioned through-openings 23 in the base plate 19. Furthermore, the sleeves 25 may be inserted into the base plate 19 and also into the cover plate 20 or may be overlapped radially on the end by the cover plate 20 and the base plate 19.

FIG. 6 shows as an example closed sleeves 25" which are pressed together with the second through-openings 28" to secure the cover plate 20 on the base plate 19.

Figure 7:
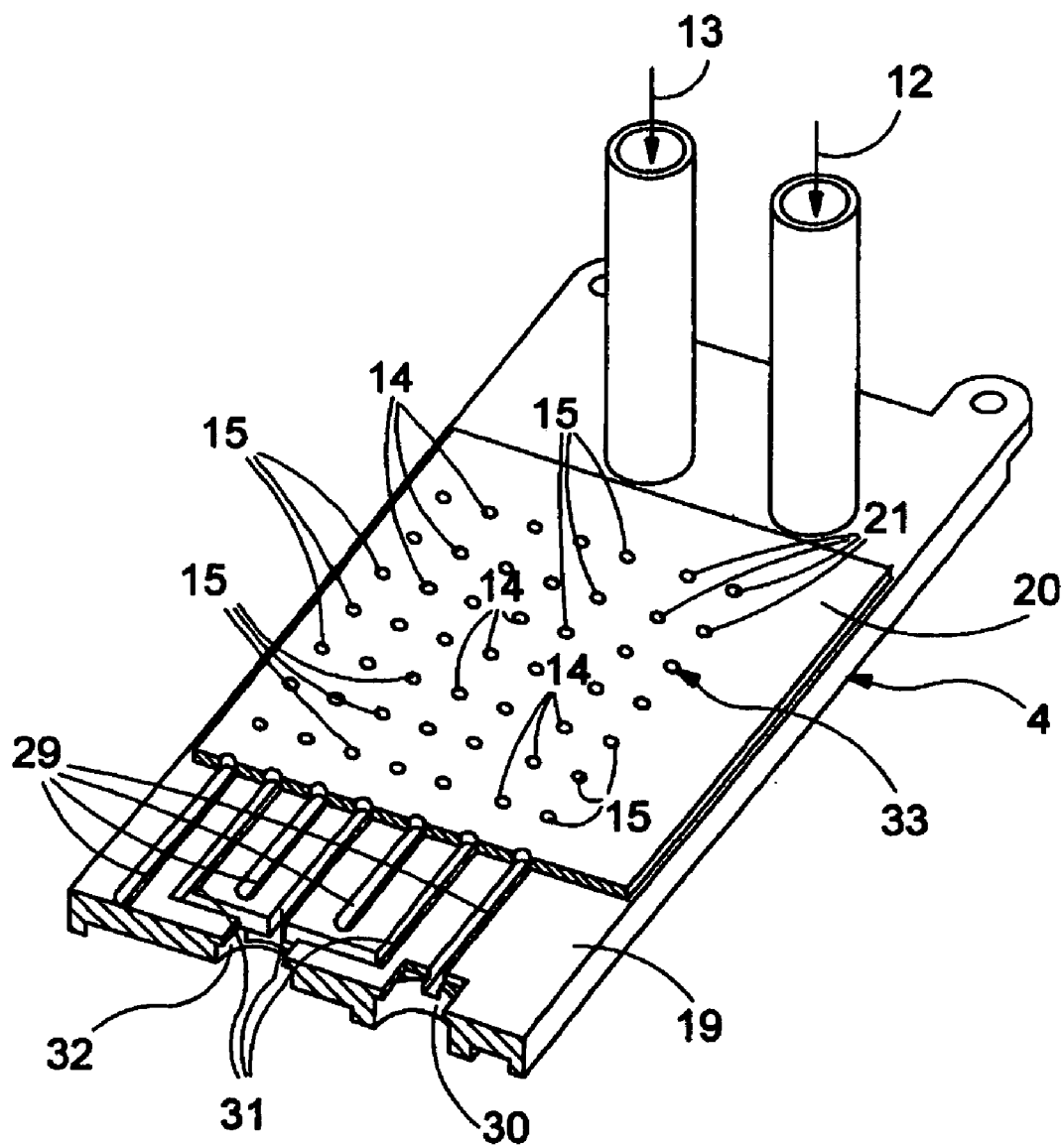

According to FIG. 7, in another embodiment, an oxidizer channel system 29 may be incorporated into the base plate 19 and connected to an oxidizer feed 30 in a suitable manner. In a corresponding manner in this embodiment, a fuel channel system 31 which is connected to a fuel feed 32 is also incorporated into the base plate 19. Whereas the oxidizer channel system 29 communicates with the oxidizer openings 15, the fuel channel system 31 is connected to the fuel openings 14. The individual channels in the channel systems 29 and 31 are incorporated, e.g., by cutting or stamping, into the base plate 19 on the side facing the combustion chamber 3. The channels are thus open toward the combustion chamber 3. However, they are covered by the cover plate 20, with the cover plate 20 again being provided with the first through-openings 21 which here form a hole pattern 33. This hole pattern 33 is coordinated with the channel system 29 so that the first through-openings 21 in the cover plate 20 come to lie on the individual channels of the channel systems 29, 31 and thereby form the fuel openings 14 and the oxidizer openings 15.

In the installed state, the fuel feed 32 is connected to the fuel path 12 of the fuel cell 8, while the oxidizer feed 30 is connected to the oxidizer path 13 of the fuel cell 8.

The burner 2 expediently usually includes an ignition device (not shown here) and a sensor system (not shown here), in particular for measuring temperatures, pressures and/or emissions.

The invention claimed is:

1. A burner for burning a gaseous fuel containing hydrogen with a gaseous oxidizer containing oxygen comprising:
    a combustion chamber having an inlet side and in which the combustion reaction takes place during operation of the burner, and
    a wall structure, which seals off the combustion chamber on the inlet side and comprises:
        multiple fuel openings through which the gaseous fuel is introduced into the combustion chamber during operation of the burner, and
        multiple oxidizer openings through which the gaseous oxidizer is introduced into the combustion chamber during operation of the burner,
    wherein:
        the combustion chamber is surrounded laterally by an outside wall and an inner wall,
        a cooling space is provided between the inside wall and the outside wall, said cooling space being connected to the multiple oxidizer openings in the wall structure and communicating with the combustion chamber, and
    wherein
        the wall structure forms one of two end plates of a fuel cell having multiple electrolyte plates between the end plates, with a fuel path and an oxidizer path being provided between said electrolyte plates.

2. The burner according to claim 1, further comprising at least one heat exchanger which is heated by the heat of combustion during operation of the burner and is tied into a heating circuit which serves to heat at least one member selected from the group consisting of: an internal combustion engine, a passenger compartment of a motor vehicle, a cargo area of a motor vehicle, and, at least one educt of a reformer and fuel cell.

3. The burner according to claim 1, wherein
    the gaseous fuel is formed by a hydrogen-product gas mixture discharged on the anode side of a fuel cell, and
    the gaseous oxidizer is formed at least partially by an oxygen-product gas mixture coming out of the cathode side of the fuel cell.

4. The burner according to claim 1, wherein the fuel openings and the oxidizer openings are situated in one plane.

5. The burner according to claim 1, wherein the oxidizer openings and the fuel openings are arranged in at least one of a uniform and symmetrical distribution.

6. The burner according to claim 1, wherein:
    the wall structure has a base plate and a cover plate arranged on a side of the base plate facing the combustion chamber, and
    the cover plate has multiple first through-openings, at least a few of which form the fuel openings or the oxidizer openings.

7. The burner according to claim 6, wherein a hollow space is formed between the cover plate and the base plate and communicates with the first through-openings.

8. The burner according to claim 7, wherein:
    the base plate has multiple through-openings which communicate with a feed chamber being separated from the hollow space by the base plate, and
    during operation of the burner, one of the gaseous oxidizer and fuel is supplied to the combustion chamber through the hollow space, and the other is supplied to the combustion chamber through the feed chamber.

9. The burner according to claim 8, wherein the through-openings in the base plate are arranged coaxially with the first through-openings in the cover plate so that during operation of the burner, the gaseous oxidizer or fuel supplied via the feed chamber and the gaseous oxidizer or fuel supplied via the hollow space enter the combustion chamber, with the gaseous oxidizer or fuel supplied via the teed chamber being enclosed by the gaseous oxidizer or fuel supplied via the hollow space.

10. The burner according to claim 9, wherein the first through-openings in the cover plate aligned with the through-openings in the base plate each have a larger cross section than the respective through-opening in the base plate.

11. The burner according to claim 9, wherein:
    at least some of the through-openings in the base plate are surrounded by sleeves that protrude away from the base plate and into the hollow space and lead to the respective first through-openings in the cover plate,
    at least some of the sleeves are open at an end remote from the base plate, and,
    at least some of the sleeves have an annular gap formed radially between the sleeve and an opening edge of the respective first through-opening in the cover plate such that during operation of the burner, gaseous oxidizer or fuel supplied via the hollow space enters the combustion chamber.

* * * * *